United States Patent Office 3,050,919
Patented Aug. 28, 1962

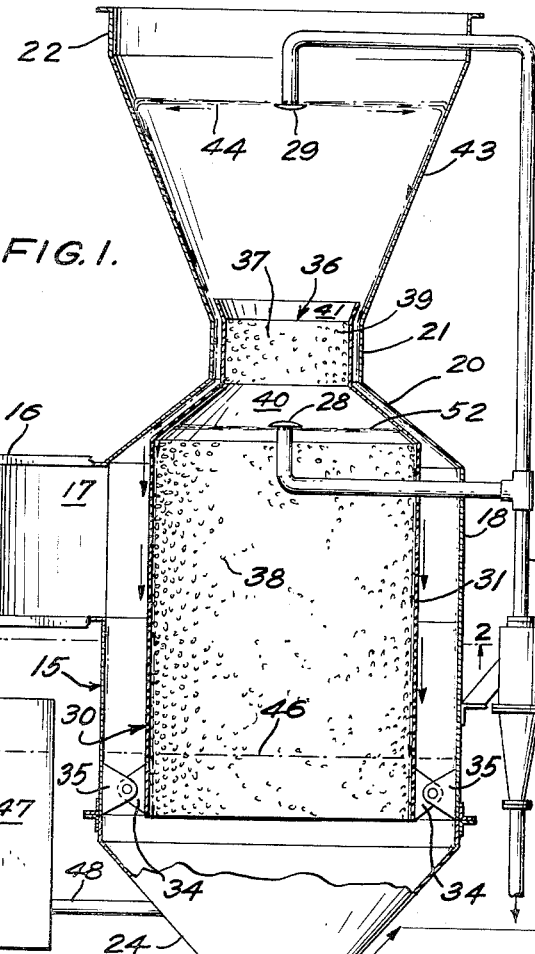
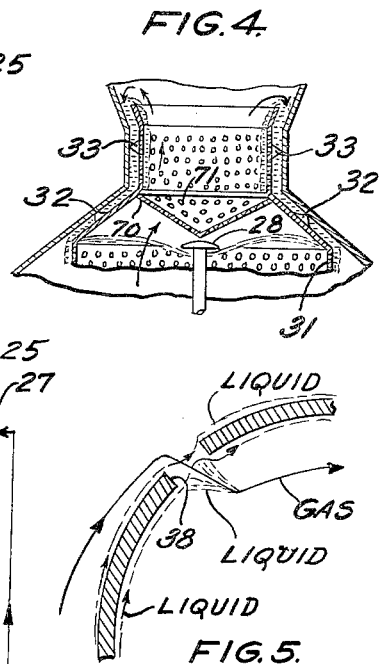
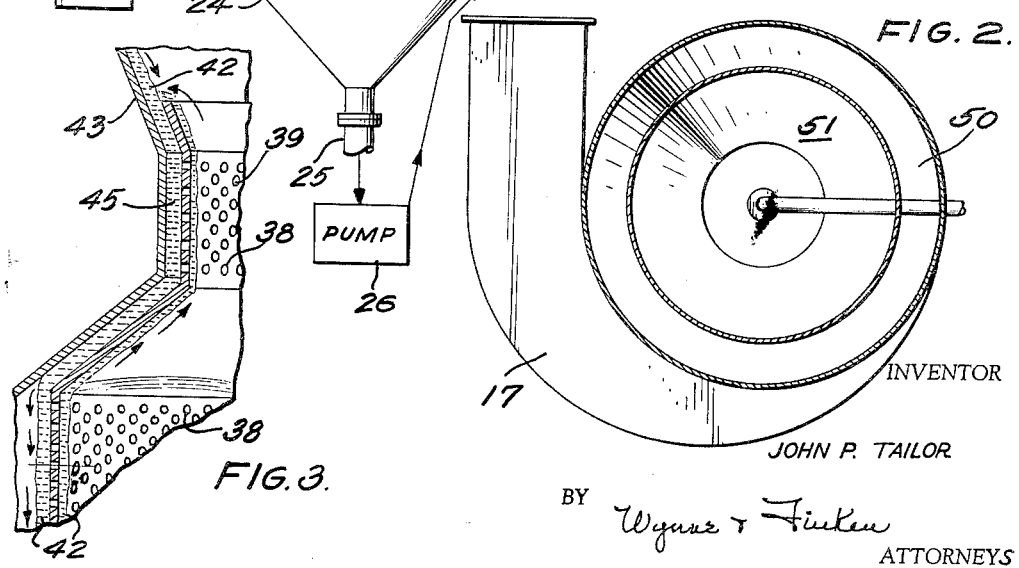

3,050,919
GAS-LIQUID CONTACT PROCESS AND
APPARATUS
John P. Tailor, 1840 W. 2nd St., Davenport, Iowa
Filed Dec. 11, 1959, Ser. No. 858,906
7 Claims. (Cl. 55—90)

My invention relates to the process and apparatus for removing contaminants from a gas. More particularly, my invention relates to the process and apparatus for scrubbing a contaminated gas with a liquid in a manner which insures the formation and maintenance of a film of liquid which completely and continuously covers and flows over a baffle surface to insure contact of the contaminated gas with the liquid. Broadly, my invention is directed to contacting a gas with a liquid.

Numerous processes and apparatus are available today for scrubbing contaminated gas. The maintenance of a liquid film over the complete surface of a baffle means has presented a most serious problem and inadequacies in design have resulted in the formation of open liquid-free spaces through which the contaminated gas tends to form gas channels. Such failures result in a substantial reduction in the efficiency of gas scrubbing. My invention provides for complete contact without channeling.

The apparatus and process of my invention include a compact system capable of scrubbing large quantities of gas rapidly and effectively. My invention with minor changes in construction may be used for many different applications. It is adapted particularly for the removal of dusts from gases and for the removal of finely divided coal particles from a moisture laden gas received from a coal dryer. Somewhat similar applications of the invention will be found in the paint spray field, the aeration of chemical reagents and the promotion of chemical reactions in which a gaseous material is reacted with solid or liquid particles.

The process of my invention involves the formation of a tubular-like flowing film of liquid within a chamber and the passage of contaminated gas spiralling inwardly into engagement therewith and ultimately therethrough. The spiralling gas causes the liquid to swirl and flow in a curved path. The tubular-like flowing film is sealed through liquid seals at top and bottom to cause the contaminated gas to flow through the resultant swirling liquid film. The sealed zone between the liquid seals may be varied to control the amount of liquid film and the gas containing capacity of my system.

The apparatus of my invention comprises a housing in which is mounted a tubular like baffle means which defines an inner zone and an annular zone. The baffle means is formed of perforate sheet material which is mounted in a manner which spaces it from the inner walls of the housing. Means are provided for introducing contaminated gas substantially tangentially with an inwardly spiralling motion to accomplish intimate contact of the gas with liquid flowing on the baffle. Means are provided for controllnig the flow of gas in contact with the liquid and eventually through the baffle for flow upwardly through at least one sheet of fluid being sprayed onto the walls of the unit.

The foregoing and other objects of my invention will be in part apparent and in part pointed out in the following description of a preferred embodiment of the invention considered in conjunction with the accompanying drawings wherein:

FIG. 1 is a front view partially in section showing the elements of my invention, part of the conducting pipes being shown schematically.

FIG. 2 is a view looking upwardly as shown by line 2—2 of FIG. 1.

FIG. 3 is an enlarged view of a portion of the venturi of FIG. 1.

FIG. 4 is a front view in section of a modified design at the venturi, and

FIG. 5 is a schematic showing of the contact between gas and liquid.

Referring now to FIGS. 1, 2 and 3, it will be seen that my invention includes a housing which in the preferred embodiment shown takes the form of an upright cylindrical housing generally indicated by numeral 15. This housing has a contaminated gas inlet 16 preferably in the form of a scroll 17 positioned at the top of the lower portion 18 of housing 15. It will be noted that the upper portion 20 of the housing 15 includes a constricted portion 21 which at its upper end defines a scrubbed gas outlet 22. The sump bottom 24 of the housing 15 is funnel-like in shape whereby through suitable piping 25 the scrubbing liquid and removed contaminants may be suitably handled to reclaim the scrubbing liquid if desired.

In the modification shown the contaminated liquid is reclaimed by being forced by pump 26 to a cyclone-type separator 27 of usual construction for final transmission through pipes 25 to a lower spray nozzle 28 and upper spray nozzle 29.

Mounted within the housing is a baffle means generally identified by numeral 30 which includes a tubular-like baffle means 31 which is peripherally spaced from the housing 15 by narrow spacers 32 and guides 33 (FIG. 4) and is rigidly mounted thereto by ears 34 which are pinned to lugs 35. This arrangement facilitates removal of the baffle means 30 by downward withdrawal from the housing 15.

Preferably, the tubular-like baffle means 31 is an upright cylindrical baffle means mounted concentrically within the housing. The baffle means 30 also includes a venturi 36 which is positioned adjacent the necked in or constricted portion 21 of the housing 15. It will be noted that the lower portion 31 of the baffle means 30 is perforated with holes 38 and that the vertically disposed cylindrical portion 37 of its venturi 36 is perforated by holes 39 (FIG. 3). Further, it will be noted that the lower conical part 40 of the venturi 36 is not perforated and that the upper conical lip 41 is not perforated.

A tubular-like flowing film 42 (FIG. 3) of scrubbing liquid is preferably formed in the chamber by spraying liquid on the wall of the chamber. Liquid is sprayed by nozzle 29 on the uppermost funnel portion 43 of the housing, the spray being in the form of a horizontally extending flat sheet 44 of liquid. The liquid thereby forms a film 42 (FIG. 3) on the funnel portion 43 and flows downwardly over the wall into the venturi annular zone 45 between the venturi 36 of the baffle means 30 and the venturi shaped portion 21 of the housing 15. Sufficient liquid is provided to maintain a liquid seal in the venturi annular zone 45 to prevent contaminated air from bypassng its normal route through the equipment. The liquid, on passing through the venturi annular zone 45, is transferred from venturi 36 to the outer surface of the lower portion 31 of the baffle means for final descent to the sump bottom 24 at the bottom of the housing 15. The level of liquid in the sump is indicated by the liquid level line 46 in FIG. 1. Make-up liquid is automatically provided by the liquid level controller 47 mounted adjacent the housing and in fluid communication with the sump of the housing through line 48.

Contaminated gas flows through the scroll 17 into inwardly spirally and tangential contact with the baffle means 30, preferably at the top of the lower portion of the baffle means. This air, due to its scroll controlled entrance pattern, tends to spiral inwardly and due to the liquid seal in the venturi annular zone 45, tends to move downwardly as it rotates around the baffle means. This gas movement causes the liquid film to flow around the baffle means and accomplishes a highly intimate contact between the gas and the liquid as the gas finds its way through holes 38 in the perforated lower portion 31 to pass from the annular zone 50 to the inner zone 51 (FIG. 2).

The second spray nozzle 28 directs a flat horizontal sheet-like spray 52 of liquid against the unperforated dome like portion or conical part 40 of the baffle means which defines the entrance to the venturi 36. This liquid flows downwardly along the inner surface of the baffle means and is also given a rotating movement by the incoming gas.

The effective capacity of the unit may be controlled by varying the liquid level in the sump 24.

Referring now to FIG. 4, it will be seen that in the modified design of my invention, an inverted cone like perforated baffle 70 with holes 71 is disposed above the lower spray nozzle 28 and provides further means for accomplishing contact of the gas with the liquid. It will be noticed also that liquid carried through the perforations 71 is swirled upwardly over the perforated cylindrical portion 37 of the venturi 36 up over the lip 41 for passage downwardly into the liquid seal 45 in the venturi annular zone.

My invention is particularly suitable for the scrubbing of gases received from a coal dryer. Experimentation and use of my invention has indicated that 12,000 cubic feet per minute of gas carrying 3 lbs. per minute of coal fines may be circulated through a unit of my invention to remove the contaminant. The contaminated gas has about 1.8 grains of contaminant per cubic foot; the scrubbed gas has less than 0.025 grain per cubic foot. The system is about 98.5% efficient. Under such circumstances, the lower spray nozzle will spray 30 gallons of water per minute and the upper spray nozzle 70 gallons per minute. The contaminated gas is about 240° F. upon entry; the scrubbed gas discharging from the unit is about 200° F. Preferably, the structure for handling this volume of contaminated gas will stand about 12 ft. high and have a major diameter of about 4 ft.

Another application of my invention is the removal of 60 lbs. per minute of entrained solids from a wet process cement kiln exhaust gas. The exhaust gas is introduced into the equipment at 100,000 cubic feet per minute, 500° F. Water is circulated at 1,017 gallons per minute, 194° F.; make-up water is added at the rate of 158 gallons per minute. As previously mentioned, 60 lbs. of solids are removed per minute and 78,600 cubic feet per minute of scrubbed gas at 212° F. are discharged.

Other typical uses of my invention would be in the iron and steel furnace field, chemical calciners, roasters, lime kilns, boilers, spray and flash dryers, TCC catalyst regenerators, catalyst reformers, acid concentrators, rotary dryers, and the like.

My invention is designed to operate with vaporizable solvents (H₂O, organics) which contact the contaminated gas on a perforated baffle means. My invention takes advantage of three basic principles of wet collecting—diffusion, condensation, and gas partition. The incoming gas is introduced at high velocity into a plenum spin chamber and then forced through a plurality of small nozzles in a vertical cylinder while scrubbing liquor simultaneously flows past the nozzles. The energy of the gas is used to atomize the liquor under the Nukiyama and Tanasawa equation:

$$D_0 = \frac{585\sqrt{\sigma}}{V\sqrt{\rho}} + 597\left(\frac{\mu}{\sqrt{\sigma\rho}}\right)0.45\left(\frac{1000Q_L}{Q_a}\right)1.5$$

The gases, once through the contact nozzles, continue to spin, giving the diffusion factor time to act. These spinning gases are then forced through a zone of diminishing area creating a vortex. Separation of the dense wet particles is effected with a very high degree of efficiency; the cleansed gases, now at their dew point, are discharged.

As seen in the schematic drawing of FIG. 5, the gas passes through a nozzle or perforation 38 and in doing so atomizes a portion of the fluid or liquor as indicated by the dotted flow lines leading to the main gas flow line. The gas continues its rotating swirling movement and eventually passes through the venturi. The equipment is designed for high velocity operation without the formation of eddy currents, thereby eliminating dirt spots which lead to fouling in so-called "turbulent" scrubbers.

The nozzles or perforations in the baffle means are preferably ½ inch diameter holes punched into metal of preferably no greater dimension than 16 gauge, the holes being punched in staggered relation on 1 inch centers. Certain particular products may require a slight variation in the hole plan and dimension; a suitable perforated design for certain products being a rectangular hole 1 inch in length and ¼ to ⅜ inch in width.

The inverted cone-like perforated baffle 70 is of particular value for providing additional wash for acid mists. In all modifications, an important feature of my invention is the simple control of the effective nozzle area by simply changing the scrubbing liquid level by suitable adjustment of the liquid level controller 47.

While a specific structure has been shown and described for illustrative purposes, it will be understood that the invention is not so limited and for that reason I wish to limit myself only within the scope of the appended claims.

I claim:

1. A method of contacting a gas with a liquid comprising the steps of forming a vertical tubular-like flowing film of liquid substantially concentrically within a chamber to define an outer annular zone and an inner zone, flowing gas around said film of liquid in said annular zone, confining said gas flow to cause inward flow from said annular zone through said flowing film of liquid to said inner zone, said forming of a tubular-like flowing film being accomplished by transversely spraying a sheet of liquid from a point within said chamber into contact with the inner surface of said tubular-like flowing film and flowing a film of liquid downwardly from the top of said chamber in contact with the outer surface of said tubular-like flowing film, and said confining of gas flow being accomplished by forming liquid seals at each end of said tubular-like flowing film.

2. A method of scrubbing contaminated gas comprising the steps of inwardly spiralling contaminated gas in a substantially horizontal flow into the lower portion of an upright cylindrical chamber, forming a cylindrical flowing film of liquid concentrically in the lower portion of said chamber to define an annular zone and an inner zone, said contaminated gas being introduced into said annular zone in the inwardly spiralling flow condition, confining said gas flow to cause inward flow from said annular zone through said film of liquid to said inner zone and upwardly through a venturi, said forming of a film of liquid being accomplished by spraying a sheet of liquid from a central point above said venturi into contact with the chamber wall for flow thereover down through the venturi annular zone for transfer to the outer surface of the cylindrical flowing film in the lower portion of the chamber and spraying a sheet of liquid from a central point at the lower part of said venturi into contact with the inner surface of said cylindrical flowing film, maintaining the venturi annular zone filled with liquid to form a seal, and maintaining the bottom of said cylindrical flowing film in a liquid pool to form a seal.

3. A method of contacting a gas with a liquid comprising the steps of inwardly spiralling gas in a substantially horizontal flow into the lower portion of an upright cylindrical chamber, forming a cylindrical flowing film of liquid concentrically in the lower portion of said chamber to define an annular zone and an inner zone, said gas being introduced into said annular zone in the inwardly spiralling flow condition, confining said gas flow to cause inward flow from said annular zone through said film of liquid to said inner zone and upwardly through a venturi, said forming of a film of liquid being accomplished by spraying a sheet of liquid from a central point above said venturi into contact with the chamber wall for flow thereover down through the venturi annular zone and for transfer to the outer surface of the cylindrical flowing film in the lower portion of the chamber and spraying a sheet of liquid from a central point at the lower part of said venturi into contact with the inner surface of said cylindrical flowing film, maintaining the venturi annular zone filled with liquid to form a seal, and maintaining the bottom of said cylindrical flowing film in a liquid pool to form a seal.

4. Gas scrubbing apparatus for producing continuous intimate contact between a liquid and a contaminated gas comprising an upright cylindrical housing having a contaminated scroll-like gas inlet in its lower portion and a scrubbed gas outlet at its upper portion, an upright cylindrical baffle means mounted concentrically within said housing to define an inner zone within said baffle means and an annular zone between said baffle means and said housing, said housing and said baffle means being similarly constricted near their upper portions to define a venturi, liquid spray means centrally mounted within said housing above said baffle means for directing a sheet-like spray outwardly to the inner wall of the housing for flow through the venturi annular zone and transfer to the outer surface of the baffle means, said venturi annular zone being smaller in transverse dimension than the lower portion annular zone and providing an upper liquid seal, the lower portion of said baffle means extending into liquid and providing a lower liquid seal, liquid spray means centrally mounted within said baffle means at the lower part of the venturi for directing a sheet-like spray outwardly to the inner wall of the baffle means, said baffle means having perforations for conducting swirling gas into said inner zone for flow upwardly to said scrubbed gas outlet.

5. Gas scrubbing apparatus for producing continuous intimate contact between a liquid and a contaminated gas comprising an upright cylindrical housing having a contaminated scroll-like gas inlet in its lower portion and scrubbed gas outlet at its upper portion, an upright cylindrical baffle means mounted concentrically within said housing to define an inner zone within said baffle means and an annular zone between said baffle means and said housing, said housing and said baffle means being similarly constricted near their upper portions to define a venturi liquid spray means centrally mounted within said housing above said baffle means for directing a sheet-like spray outwardly to the inner wall of the housing for flow through the venturi annular zone and transfer to the outer surface of the baffle means, said venturi annular zone being smaller in transverse dimension than the lower portion annular zone and providing an upper liquid seal, the lower portion of said baffle means extending into liquid and providing a lower liquid seal, liquid spray means centrally mounted within said baffle means at the lower part of the venturi for directing a sheet-like spray outwardly to the inner wall of the baffle means, said baffle means having perforations for conducting swirling gas into said inner zone for flow upwardly to said scrubbed gas outlet.

6. Gas scrubbing apparatus for producing continuous intimate contact between a liquid and a contaminated gas comprising an upright cylindrical housing having a contaminated scroll-like gas inlet in its lower portion and scrubbed gas outlet at its upper portion, an upright cylindrical baffle means mounted concentrically within said housing to define an inner zone within said baffle means and an annular zone between said baffle means and said housing, said housing and said baffle means being similarly constricted near their upper portions to define a venturi liquid spray means centrally mounted within said housing above said baffle means for directing a sheet-like spray outwardly to the inner wall of the housing for flow through the venturi annular zone and transfer to the outer surface of the baffle means, said venturi annular zone being smaller in transverse dimension than the lower portion annular zone and providing an upper liquid seal, the lower portion of said baffle means extending into liquid and providing a lower liquid seal, liquid spray means centrally mounted within said baffle means at the lower part of the venturi for directing a sheet-like spray outwardly to the inner wall of the baffle means, said baffle means having perforations for conducting swirling gas into said inner zone for flow upwardly to said scrubbed gas outlet, and means for controlling the height of liquid at said lower portion to regulate the amount of liquid film available for contact and the gas containing capacity of the annular zone and the inner zone.

7. Gas scrubbing apparatus for producing continuous intimate contact between a liquid and a contaminated gas comprising an upright cylindrical housing having a scroll-like, contaminated gas inlet in its lower portion and a scrubbed gas outlet at its upper portion, an upright cylindrical baffle means mounted concentrically within said housing to define an inner zone within said baffle means and an annular zone between said baffle means and said housing, liquid spray means centrally mounted within said housing above said baffle means for directing a sheet-like spray outwardly to the inner wall of the housing for flow downwardly thereon for transfer to the outer surface of the baffle means, means at the upper portion of said baffle means providing an upper liquid seal, the lower portion of said baffle means extending into liquid and providing a lower liquid seal, liquid spray means centrally mounted within said baffle means adjacent the upper part thereof for directing a sheet-like spray outwardly to the inner wall of the baffle means, said baffle means having perforations for conducting swirling gas into said inner zone for flow upwardly to said scrubbed gas outlet.

References Cited in the file of this patent

UNITED STATES PATENTS

| | | |
|---|---|---|
| 537,509 | Wardle et al. | Apr. 16, 1895 |
| 1,026,227 | Schmidt | May 14, 1912 |
| 1,110,868 | Bauer | Sept. 15, 1914 |
| 1,163,437 | Morison | Dec. 7, 1915 |
| 2,051,545 | Collins | Aug. 18, 1936 |
| 2,698,672 | Burnside et al. | Jan. 4, 1955 |
| 2,736,391 | Jones | Feb. 28, 1956 |